United States Patent
Gonzalez Bautista et al.

(10) Patent No.: US 12,522,203 B2
(45) Date of Patent: Jan. 13, 2026

(54) DEVICE AND METHOD FOR TRAJECTORY-DEPENDENT VEHICLE CONTROL

(71) Applicant: RENAULT S.A.S, Boulogne Billancourt (FR)

(72) Inventors: David Gonzalez Bautista, Saint Cyr l'Ecole (FR); Vicente Milanes, Guyancourt (FR); Francisco Martin Navas Matos, Vanves (FR)

(73) Assignee: AMPERE S.A.S., Boulogne Billancourt (FR)

( * ) Notice: Subject to any disclaimer, the term of this patent is extended or adjusted under 35 U.S.C. 154(b) by 151 days.

(21) Appl. No.: 18/258,306

(22) PCT Filed: Dec. 10, 2021

(86) PCT No.: PCT/EP2021/085303
§ 371 (c)(1),
(2) Date: Jul. 7, 2023

(87) PCT Pub. No.: WO2022/128821
PCT Pub. Date: Jun. 23, 2022

(65) Prior Publication Data
US 2024/0059275 A1 Feb. 22, 2024

(30) Foreign Application Priority Data
Dec. 17, 2020 (FR) ...................... 20 13432

(51) Int. Cl.
*B60W 30/045* (2012.01)
*B60W 30/12* (2020.01)
(Continued)

(52) U.S. Cl.
CPC .......... *B60W 30/045* (2013.01); *B60W 30/12* (2013.01); *B60W 40/072* (2013.01);
(Continued)

(58) Field of Classification Search
CPC .. B60W 30/045; B60W 30/12; B60W 40/072; B60W 40/105; B60W 40/114;
(Continued)

(56) References Cited

U.S. PATENT DOCUMENTS

| 9,678,605 B2 * | 6/2017 | Jordan ................... G06F 3/0446 |
| 2018/0201138 A1 * | 7/2018 | Yellambalase .......... B60L 58/12 |

(Continued)

FOREIGN PATENT DOCUMENTS

| DE | 10 2015 003 960 A1 | 8/2015 |
| EP | 3 719 449 A1 | 10/2020 |

OTHER PUBLICATIONS

French Preliminary Search Report & Written Opinion Issued Aug. 17, 2021 in French Application 20 13432 (with English Translation of Categories of Cited Documents), 9 pages.

(Continued)

*Primary Examiner* — Jason Holloway
*Assistant Examiner* — Madison B Emmett
(74) *Attorney, Agent, or Firm* — Oblon, McClelland, Maier & Neustadt, L.L.P.

(57) ABSTRACT

A vehicle control system includes a lateral control device. The lateral control device includes: a lateral controller for performing lateral control of the vehicle defined by a set of control parameters, based on minimizing a difference in a control value between a reference trajectory curve and a current trajectory curve described by the vehicle; a maximum distance determination unit for projecting the determined road layout information up to a given distance in front of the vehicle, and for determining the maximum distance at which the polynomial function representing the road layout satisfies one or more control conditions based on projected road layout information; a limit checking unit for determining a stability envelope and for checking whether limits of (Continued)

the stability envelope are reached by the vehicle based on the determined maximum distance. The control adapter adapts the control parameters of the lateral controller if the limits are reached.

12 Claims, 7 Drawing Sheets

(51) Int. Cl.
*B60W 40/072* (2012.01)
*B60W 40/105* (2012.01)
*B60W 40/114* (2012.01)
*B60W 50/00* (2006.01)
*B60W 50/14* (2020.01)
*G06V 20/56* (2022.01)

(52) U.S. Cl.
CPC ........ *B60W 40/105* (2013.01); *B60W 40/114* (2013.01); *B60W 50/14* (2013.01); *G06V 20/588* (2022.01); *B60W 2050/0013* (2013.01); *B60W 2050/0088* (2013.01); *B60W 2050/143* (2013.01); *B60W 2050/146* (2013.01); *B60W 2420/403* (2013.01); *B60W 2520/14* (2013.01); *B60W 2540/18* (2013.01); *B60W 2552/30* (2020.02); *B60W 2556/20* (2020.02)

(58) Field of Classification Search
CPC ......... B60W 50/14; B60W 2050/0013; B60W 2050/0088; B60W 2050/143; B60W 2050/146; B60W 2420/403; B60W 2520/14; B60W 2540/18; B60W 2552/30; B60W 2556/20; B60W 50/0097; B60W 2720/10; B60W 2720/14; B60W 30/10; B60W 60/0018; B60W 2520/10; G06V 20/588

See application file for complete search history.

(56) References Cited

U.S. PATENT DOCUMENTS

| 2020/0309533 | A1 | 10/2020 | Young et al. | |
| 2022/0024454 | A1* | 1/2022 | Rajvanshi | G06V 20/56 |
| 2022/0126869 | A1* | 4/2022 | Wang | B60W 60/0027 |
| 2022/0153265 | A1* | 5/2022 | Kim | B60W 60/001 |

OTHER PUBLICATIONS

Li et al., "Combining Local Trajectory Planning and Tracking Control for Autonomous Ground Vehicles Navigating along a Reference Path", IEEE 17$^{th}$ International Conference on Intelligent Transportation Systems (ITSC), Oct. 8-11, 2014, Qingdao, China, pp. 725-731, XP032685604.

* cited by examiner

DEVICE AND METHOD FOR TRAJECTORY-DEPENDENT VEHICLE CONTROL

TECHNICAL FIELD

The invention relates in general to systems for controlling vehicles, in particular to a device and method for control dependent on the trajectory of the vehicle.

In automated or semiautomated vehicles, a control system is generally used to control the dynamics of the vehicle, such as ADAS ("Advanced Driver-Assistance Systems") systems or AD ("Autonomous Driving") systems.

In order to anticipate the road to be followed and to adapt the behavior of the vehicle to unforeseen events, such control systems may use an on-board trajectory sensor tasked with detecting the layout of the roads, in order to estimate the trajectory that the vehicle needs to follow. It may, however, occur that such a sensor suddenly reduces its electronic horizon (that is to say its field of vision), which impacts on the visibility of the road layout.

Some vehicle control systems depend greatly on the identification of the road layout carried out by the trajectory sensor, which makes it possible to evaluate the distance at which the vehicle can see the lane in which it is moving. However, existing control systems authorize activation of the autonomous control system even when the visibility of the road layout is low, so that when the system is activated, it occurs that the vehicle leaves the road.

There are more sophisticated autonomous driving systems, based on trajectory planning, which are capable of providing the control system of the vehicle with a soft reference trajectory. This trajectory is based on the speed and depends on the capacities of the on-board trajectory sensor. Such a control system employs a static vehicle controller, which may use the predicted curvature of the lane or a feedback parameter in order to perform lateral control of the vehicle. The static controller is activated in order to follow the reference trajectory correctly for a given speed of the vehicle. In some situations, the static controller may require relatively distant road layout information items, which means that the static controller may generate an undesirable behavior, to the extent of bringing the vehicle outside the limits of the lane.

U.S. Pat. No. 9,731,755B1 proposes a method for providing a lateral vehicle steering control. The method uses a mathematical model of the dynamics of the vehicle, which comprises a state variable, a steering control variable and a future disturbance factor of the road. However, even this solution does not make it possible to provide effective control in situations in which the on-board sensor has degraded operation.

There is thus a need for a device and a method for improved control of the vehicle.

General Definition of the Invention

The invention aims to improve the situation by proposing a system for controlling a vehicle comprising a perception system that uses at least one trajectory sensor to determine a road layout, the road layout representing the trajectory to be followed by the vehicle. Advantageously, the system comprises a lateral control device comprising:
- a road detector configured to determine, for a current state of the vehicle, information items of the road layout ahead of the vehicle on the basis of information items provided by the perception system, the road layout being represented by a polynomial function having a given order;
- a lateral controller configured to perform a lateral control of the vehicle, which is defined by a set of control parameters, on the basis of a minimization of a difference in a control value between a reference trajectory curve of the vehicle and a current trajectory curve being described by the vehicle, which corresponds to the current state of the vehicle;
- a maximum distance determination unit configured to project the road layout information items that have been determined to a given distance ahead of the vehicle, and to determine the maximum distance at which the polynomial function satisfies one or more control conditions on the basis of the projected road layout information items;
- a limit verification unit configured to determine, for the current state of the vehicle, a stability envelope of the vehicle which is defined by limits corresponding to the application conditions of a control adapter of the vehicle, and to verify whether said limits of the stability envelope have been reached by the vehicle on the basis of the maximum distance that has been determined;
- the control adapter being configured to adapt the control parameters of the lateral controller if said limits have been reached, on the basis of the current state of the vehicle.

In one embodiment, the current state of the vehicle may be defined by at least one state parameter among the steering angle of the vehicle, the steering angular velocity of the vehicle, the speed of the vehicle, the target curvature of the vehicle at the current instant considered.

The control conditions may define acceptability conditions of a set of predefined vehicle control objectives.

In some embodiments, the lateral control device may furthermore comprise a minimal performance verification unit configured to verify conditions relating to a set of auxiliary parameters that relate to the quality of the response of the vehicle to the control applied by the lateral control device, the control parameters comprising at least:
- a reliability parameter of the response of the vehicle to the control, and
- a feasibility parameter of the response of the vehicle with respect to the dynamics of the vehicle as a function of the maximum distance determined by the maximum distance determination unit.

In one embodiment, the lateral control device furthermore comprises a vehicle actuator manager configured to manage at least one actuator of the vehicle as a function of the maximum distance calculated by the maximum distance determination unit and of the output of the lateral controller.

In some embodiments, the lateral control device may furthermore comprise a display manager configured to generate a display of the control mode of the vehicle as a function of the output of the maximum distance determination unit and of the quality level of the control adapter, the control mode comprising a mode among a non-autonomous mode, in which the control system is not activated, and an autonomous mode, in which the control system is activated.

In particular, the level of the quality of the control adapter may be determined by the minimal performance verification unit, the minimal performance verification unit being configured to generate an alert signal if the quality level of the control adapter is greater than a predefined threshold.

In one embodiment, the control adapter may be configured to adapt the control parameters on the basis of a minimization of the difference between a target yaw rate of the vehicle and a current yaw rate of the vehicle.

The target yaw rate of the vehicle may be calculated on the basis of a target curvature of the vehicle and the current position of the vehicle.

In some embodiments, the control adapter may be configured to minimize the yaw rate error ($\omega_{error}$) by multiplying it by a controller gain (K).

A vehicle control method is furthermore provided, which is implemented in a vehicle comprising a perception system that uses at least one vehicle trajectory sensor to determine a road layout, the road layout representing the trajectory to be followed by the vehicle, and a lateral controller that performs a lateral control of the vehicle defined by a set of control parameters, on the basis of a minimization of a difference in a control value between a reference trajectory curve of the vehicle and a current trajectory curve being described by the vehicle. Advantageously, the method comprises, for a current state of the vehicle, the following steps:
- determining road layout information items corresponding to the current state of the vehicle on the basis of information items provided by the perception system, the road layout being represented by a polynomial function;
- projecting the road layout information items that have been determined to a given distance ahead of the vehicle,
- determining the maximum distance at which the polynomial function satisfies one or more control conditions on the basis of the projected road layout information items;
- determining a stability envelope of the vehicle, which is defined by limits corresponding to the application conditions of a control adapter of the vehicle, and
- determining whether the limits of the stability envelope have been reached by the vehicle on the basis of the maximum distance that has been determined;
- adapting the control parameters of the control adapter if said limits have been reached, on the basis of the current state of the vehicle.

The invention furthermore provides a computer program comprising program code instructions for carrying out the steps of such a method, when the program runs on a computer.

The embodiments of the invention thus make it possible to provide a dynamic lateral control of the vehicle, which is adapted to the electronic horizon of the trajectory sensor.

The embodiments of the invention make it possible to ensure optimal control in situations in which the on-board sensor tasked with detecting the road trajectory (forthcoming trajectory that the vehicle is required to follow) suddenly reduces its electronic horizon, corresponding to its field of vision.

BRIEF DESCRIPTION OF THE DRAWINGS

Other characteristics, details and advantages of the invention will become apparent upon reading the description made with reference to the appended drawings, which are given by way of example and which respectively represent:

FIG. 4 represents the target trajectory vector index and the trajectory error corresponding to the case in which FIG. 3 is used, for a control device of the prior art;

FIG. 6 represents the target trajectory vector index and the trajectory error corresponding to the case in which FIG. 5 is used, for a control device according to the embodiments of the invention and for a control device of the prior art;

DETAILED DESCRIPTION

Figure 1:
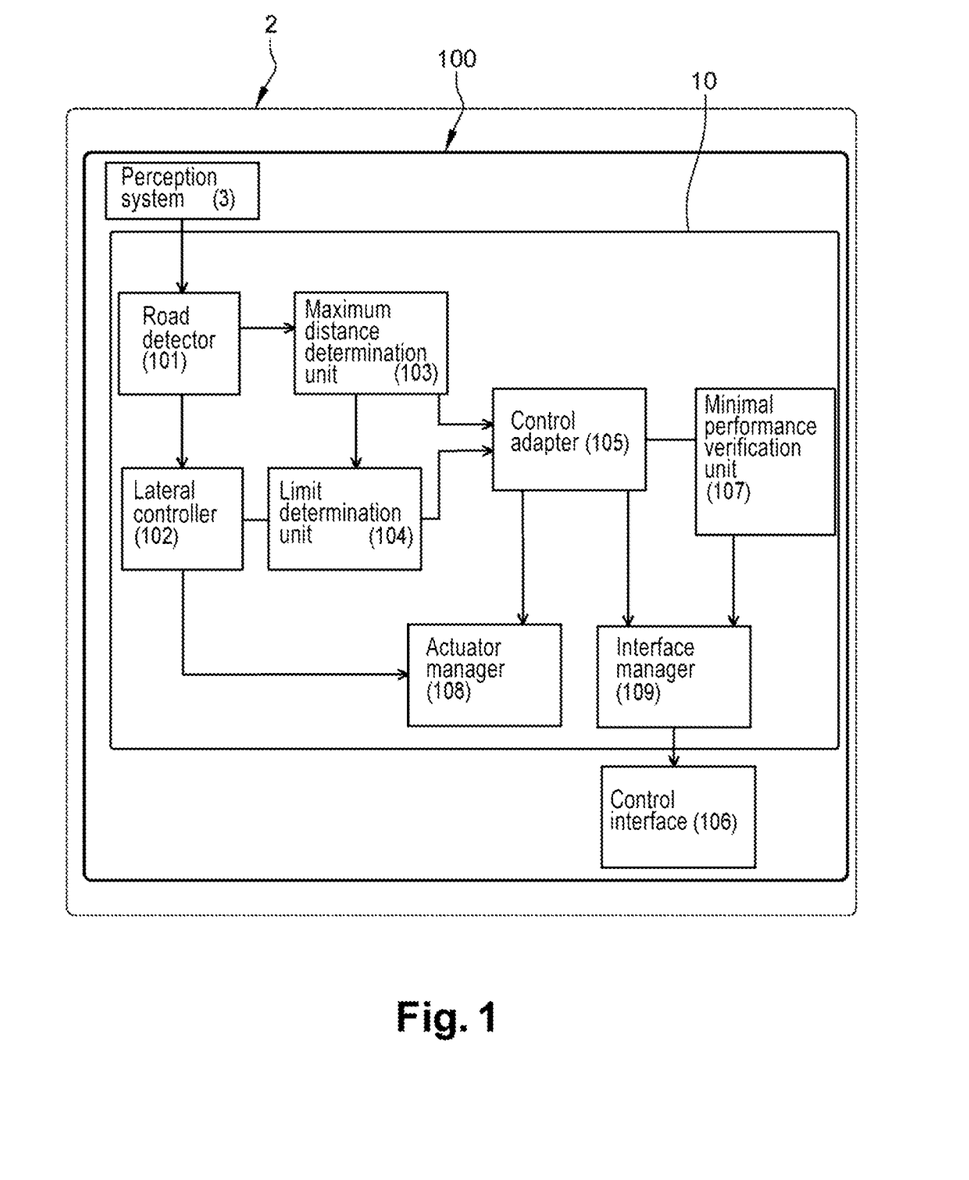
FIG. 1 represents a control system according to some embodiments of the invention.

FIG. 1 represents a control system 100 according to some embodiments of the invention.

The vehicle 2 may be an automated vehicle (for example an autonomous vehicle) or a semiautomated vehicle (the vehicle 2 is also referred to as an "ego vehicle").

The control system 100 may use information items detected by one or more sensors on board the vehicle 2. The sensors may, in particular, comprise at least one trajectory sensor associated with an electronic horizon (referred to below as an "e-horizon"). The sensors form part of a perception system 3.

The electronic horizon (or "e-horizon") associated with a sensor generally refers to the longest distance (in meters) at which the sensor can operate. The electronic horizon may be connected with the longest distance at which a sensor (for example of the camera type) can detect lane marking lines precisely; such information may, for example and without limitation, come from digital maps. In an exemplary perception system 3 based on one sensor of the camera type and another sensor of the lidar type, the electronic horizon may for example be located between 40 and 100 meters, depending on the quality of the lidar.

The set of sensors may furthermore comprise by way of example one or more sensors among a lidar (Laser Detection and Ranging), a radar, a camera (camera operating in the visible or camera operating in the infrared), an ultrasonic sensor, a steering-wheel angle sensor, a wheel speed sensor, a braking pressure sensor, a sensor of yaw rate and transverse accelerations, etc.

Advantageously, the control system 100 implements a dynamic control adapted to the electronic horizon detected by a trajectory sensor (not represented) on board the vehicle 2.

The control system 100 may, for example and without limitation, be a driving assistance system such as an ADAS or AD system.

The control system 100 is capable of controlling the dynamics of the vehicle 2 in response to a requested instruction.

The perception system 3 may be configured to detect and/or identify objects in the vicinity of the vehicle 2 on the basis of the information items measured by the sensors. The perception system 3 may furthermore use fusion algorithms to process the information items coming from the various sensors and use the processed information items in perception operations, such as the detection and/or tracking of obstacles, tracking and prediction of the evolution of the environment of the vehicle 2 in the course of time, the generation of a map in which the vehicle 2 is positioned, localization of the vehicle 2 on a map, determination of the global location of the vehicle 2, etc. Such multi-sensor fusion algorithms may combine information items coming from the various sensors. The perception system may in particular use data provided by a positioning system. The positioning system may advantageously be a GNSS satellite positioning system (acronym for "Global Navigation Satellite System"). The GNSS system may furthermore be configured to provide information items relating to the position of the vehicle 2, but also to the vehicle position detected in the vicinity of the vehicle 2.

The autonomous driving control system 100 uses at least one vehicle trajectory sensor to determine a road layout, the road layout representing the trajectory to be followed by the vehicle 2.

The control system 100 comprises a lateral control device 10 configured to provide a control of the vehicle adapted to the e-horizon of the trajectory sensor 200.

In some embodiments, the lateral control device 10 may comprise a perception-based road detector 101 configured to determine, for a current state of the vehicle, information items of the road layout ahead of the vehicle, corresponding to the current state of the vehicle, on the basis of information items provided by the perception system 3. The current state of the vehicle is defined by a set of state parameters corresponding to the current instant.

The road detector 101 may use data provided by any sensor or any component for detection of navigable space (for example a camera) capable of capturing such information items. The road detector 101 may provide at its output a polynomial of order n representing the road layout corresponding to the trajectory to be followed by the vehicle 2.

The control device may furthermore comprise a lateral controller 102 and a maximum distance determination unit 103, to each of which the output of the road detector 101 is transmitted.

The lateral controller 102 is a so-called "optimal" lateral controller configured to perform a lateral control of the vehicle 2, which is defined by a set of control parameters, on the basis of a minimization of a difference in a control value between a reference vehicle trajectory curve (target or desired curve) and a current trajectory curve being described by the vehicle, which corresponds to the current state of the vehicle 2.

In one embodiment, the current trajectory curve of the vehicle may be calculated on the basis of the steering angle of the vehicle 2 at the current instant considered, and a lateral dynamic model of the vehicle 2, while assuming that the vehicle is describing a circle in order to maintain a constant direction.

The maximum distance determination unit 103 (also referred to as an "e-horizon analyzer") is configured to project the road layout information items that have been determined in the scene of the vehicle to a given distance ahead of the vehicle 2, and to determine the maximum distance at which the polynomial function representing the road layout satisfies one or more control conditions, on the basis of the projected road layout information items. In one embodiment, the control conditions define acceptability conditions of a set of predefined vehicle control objectives. In such an embodiment, the maximum distance represents the distance at which the polynomial function of the perception-based road detector is acceptable for such vehicle control objectives, for instance vehicle tracking objectives. A control objective may relate to a parameter connected with the dynamics of the vehicle and defined by a target value of this quantity. An example of a control objective may for example be the target yaw rate.

The maximum distance determination unit 103 thus makes it possible to obtain a correct measurement of the navigable road space for precise tracking of the center of the traffic lane of the vehicle. The maximum distance determination unit 103 may identify in real-time the limitations of the polynomial measurement that are necessary so that the controller 102 can track a reference. The further away the detected lane limits are, the more impact they have on the determination of a correct target lateral point that needs to be followed by the vehicle.

The maximum distance determination unit 103 thus guarantees the limit at which the polynomial function representing the road layout can be used for the vehicle control objectives (for example tracking).

The target reference that needs to be tracked by the controller is also referred to as a control target point (also referred to as a "lookahead point"). The control target point allows the controller 102 to predict future trajectory instructions by anticipating the future states of the vehicle 2. The control target point may be placed ahead of the vehicle 2 at a distance-control distance. The lateral control device 10 may furthermore comprise a limit verification unit 104 configured to determine the smallest value that this distance can take. On the basis of the polynomial trajectory, the lateral controller 102 minimizes a given point of the trajectory, corresponding to the control target point.

In one embodiment, the limit verification unit 104 (also referred to as a "limit violation verification unit") is configured to determine, for the current state of the vehicle, a stability envelope of the vehicle defined by limits corresponding to the application conditions of a control adapter 105 of the vehicle, and to verify whether the limits of the stability envelope have been reached by the vehicle on the basis of the maximum distance that has been determined. The limits of the stability envelope thus correspond to the application limits of the lateral controller 102.

The limit verification unit 104 may thus determine whether the distance detection capacities of the perception system 3 are sufficient for applying the lateral controller 102, on the basis of the output of the maximum distance determination unit 103 and of the output of the lateral controller 102. The limit verification unit 104 may in particular be configured to analyze the stability envelope of the vehicle with a maximum variation of the inputs maintaining good performance. If the limits of the stability envelope for the application of the lateral controller 102 have been reached, the limit verification unit 104 may emit a limit attainment notification to the control adapter 105, also referred to as an "optimal controller adapted to the e-horizon").

The control adapter 105 is configured to adapt the control parameters of the lateral controller if the limits of the stability envelope have been reached, on the basis of the current state of the vehicle defined by a set of state parameters. In one embodiment, the set of state parameters defining the current state of the vehicle may comprise one or more state parameters among: the steering angle, the steering angular velocity, the speed of the vehicle, the desired vehicle trajectory curvature.

The control adapter 105 may thus use the output of the limit verification unit 104 and of the maximum distance determination unit 103 to determine the better controller to be applied as far as the available e-horizon, on the basis of the current state of the vehicle as defined by the set of state parameters.

The control device 10 may compare the lane detection based on a sensor of the camera type with a "possible" trajectory planner that provides a short trajectory, smaller than that required by the lateral controller 102 in order to operate correctly. In such an embodiment, the controller 102 may also detect a lack of trajectory and either adapt its lookahead distance or decelerate.

The control adapter 105 may thus advantageously modify the control criteria by using the available trajectory information in real-time in the maximum distance determination unit 103.

In some embodiments, the control device 10 may furthermore determine an availability indicator of the autonomous control system as a function of the capacity of the lateral controller 102 to find a control solution and/or an indicator representative of the performance of the control in relation to an acceptable threshold.

The control system 100 may comprise a human-machine interface HMI 106 (also referred to as a "control interface") provided in the passenger compartment of the vehicle, for example on the dashboard of the vehicle, for generating a display of such indicators in order to inform or warn the driver or the passengers more generally.

In some embodiments, if the maximum distance determined by the maximum distance determination unit 103 (e-horizon analyzer) is not sufficient to guarantee correct behavior of the lateral control of the vehicle for the most extreme cases (that is to say cases that reach the limits of controllability), the vehicle 2 may adapt its speed in order to ensure its safety. More precisely, the control system 100 may determine whether current information items originating from sensors of the perception system 3 (for example a camera, or any other navigation system) are valid and may control the vehicle in the best possible way given the current information items, while reducing the speed as a last resort in order to guarantee safety of the vehicle.

In some embodiments, the control device may comprise a minimal performance verification unit 107 configured to verify conditions relating to a set of auxiliary parameters that relate to the quality of the response of the vehicle to the control applied by the control device 10. The auxiliary quality parameters of the control thus represent the quality of the control adapted to the e-horizon. In one embodiment, the auxiliary parameters may comprise:

a reliability parameter of the response of the vehicle to the control, and/or a feasibility parameter of the response of the vehicle with respect to the dynamics of the vehicle as a function of the maximum distance determined by the maximum distance determination unit 103.

The minimal performance verification unit 107 may generate an alert notification when the quality measured by the auxiliary parameters does not satisfy predefined quality limits.

The minimal performance verification unit 107 thus makes it possible to verify various auxiliary parameters that relate to the response of the vehicle to the control from the point of view of the dynamics of the vehicle 2, and thus the minimal performance of the control.

In one embodiment, the control device may furthermore comprise a manager 108 of actuators of the vehicle, which is configured to control one or more controllers of the vehicle by sending them instructions as a function of the maximum distance calculated by the maximum distance determination unit 103 and of the output of the lateral controller 102. Such actuators may for example comprise the actuator of the steering wheel of the vehicle, as well as the actuator of the accelerator of the vehicle and/or the actuator of the brake pedals of the vehicle, if the vehicle needs to adjust its speed.

The actuator manager 108 may send instruction messages to the actuators (not represented) of the vehicle via the lateral controller 102 or the control adapter 105, as a function of the current control.

In some embodiments, the control device may also comprise a display manager 109 configured to activate or deactivate the control interface 106 of the control system.

The display manager 109 may furthermore be configured to generate a display of the control mode of the vehicle as a function of the output of the maximum distance determination unit 103 and of the quality level of the control adapter 105, the control mode comprising a mode among a non-autonomous mode, in which the control system is not activated, and an autonomous mode, in which the control system is activated.

The control adapter 105 may transmit to the display manager 109 information items indicating that a degraded mode of the control, which is no longer the lateral controller 102, has been activated. The display manager 109 may also use the output of the minimal performance verification unit 107, which indicates the quality of the controller adapted to the e-horizon, in order to generate a display of an alarm when the quality of the control adapted to the e-horizon (measured by the auxiliary quality parameters) does not satisfy the predefined quality limits.

In some embodiments, the control system 100 may work according to two operating modes:

in a first operating mode, the control system may ignore an activation of the autonomous driving mode selected by the user (driver or passenger) if it is determined, on the basis of the calculated maximum distance, that the optimal lateral control implemented by the controller 101 cannot be applied (for example if the road layout to be followed, as detected by the road detector 101, is not far enough away);

in a second operating mode, if the vehicle 2 is already in autonomous mode and it is determined, on the basis of the calculated maximum distance, that the optimal lateral control implemented by the controller 101 cannot be applied, the control adapter 105 is activated in order to adapt the control in real-time while considering the effective road layout identification capacities, which provides the best performance possible. In such a mode, it is possible to evaluate whether the performance of the control is safe and ensures satisfactory comfort on the basis of the output of the minimal performance unit 106.

An example of the implementation of the control steps that are applied by the method and the control system 100 according to the embodiments of the invention is described below.

In such an example, it is assumed that the trajectory of the vehicle as detected by the road detector 101 is initially long enough to allow the lateral controller 102 to follow the path by using the perception-based road detector 101, which provides the trajectory to be followed, and the optimal lateral controller 102, which follows the trajectory.

When the trajectory information detected by the road detector 101 is no longer sufficient, for example in case of a sudden reduction in distance of a trajectory that is provided, or when the trajectory information is too affected by noise, the maximum distance determination unit 103 (e-horizon analyzer) may notify the control adapter 105 and the limit verification unit 104 of this in order for it to be verified whether the lateral controller 102 can guarantee the control in the identified situation on the basis of the maximum distance determined by the maximum distance determination unit 103. If the trajectory information detected by the road detector 101 is too degraded, the control adapter 105 may adapt the control while considering a new available trajectory distance.

The embodiments of the invention thus allow dynamic modification of the control parameters so that the control adapter 105 can achieve the defined control objective or objectives with fewer information items than the lateral controller 102, by adapting to the lack of information items.

In one embodiment, a control objective may be the target yaw rate, the lateral controller 102 then being based on a minimization of the difference $\omega_{error}$ between:
- the target yaw rate $\omega_{target}$ (representing the desired yaw rate) calculated on the basis of the target trajectory curvature and the position of the vehicle, and
- the current yaw rate $\omega_{measured}$ of the vehicle, which may be determined on the basis of sensor measurements of the perception system 3.

This difference is also referred to as a "yaw rate error".
The desired steering-wheel steering angle instruction is defined by:

$$\omega_{error} = \omega_{target} - \omega_{measured} \quad (1)$$

In one particular embodiment, the lateral controller 102 may be configured to minimize the yaw rate error $\omega_{error}$ by multiplying it by a controller gain K in order to obtain the desired steering-wheel steering angle S according to Equation (2):

$$\delta = K \cdot \omega_{error} \quad (2)$$

The invention applies to any lateral controller 102 based on a localization of a control target point, for example a pure pursuit method, a Stanley method, etc.

Figure 2:
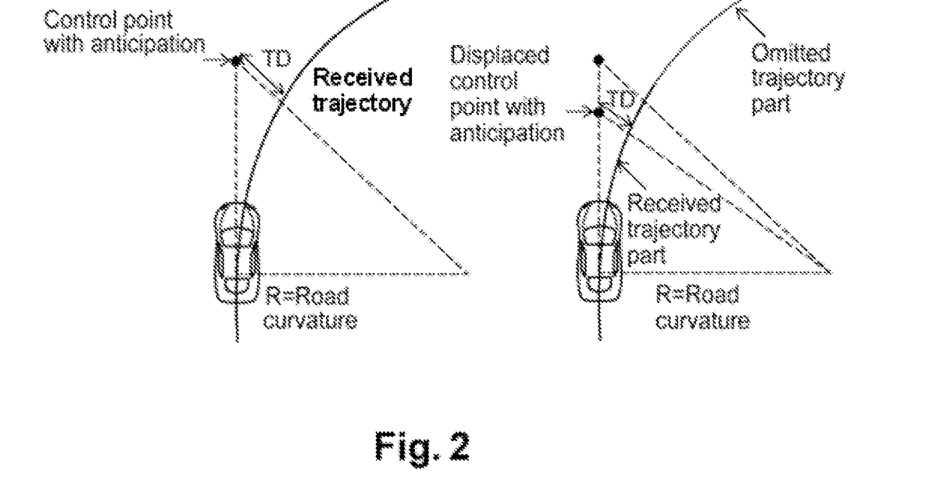
FIG. 2 illustrates an exemplary scenario of degraded driving.

FIG. 2 illustrates an exemplary degraded scenario. FIG. 2 shows in particular the way in which the control target point may be modified in case of degraded trajectory information items provided by the road detector 101.

The optimal control target point may be determined on the basis of the received trajectory, and in particular of the distance TD representing the distance of the control target point. This distance is generally calculated for an optimal control response, although it may be calculated for a degraded detection as in the example of FIG. 2.

On the left of FIG. 2, the vehicle 2 receives a correct trajectory to be followed, the road layout provided by the road detector 101 (which may for example be a lane marking system). On the right of FIG. 2, it may be seen that the trajectory generation is no longer possible, the trajectory information items being insufficient (the part in dashes is not provided). In such a scenario, the vehicle 2 is then caused to operate in a degraded mode in order to try to achieve the same road curvature but with fewer information items a priori. The lateral controller 102 then can no longer operate optimally with respect to the comfort parameters (control objective), but it can nevertheless follow the trajectory correctly, or at least keep the vehicle in the lane.

The operation of the control device 10 may depend on the availability of a correct control target point.

As illustrated by FIG. 2, if the received trajectory is smaller than the optimal trajectory, the control device 10 adapts the control so as to be able to achieve the control objective, for example the yaw rate objective defined by the target yaw rate, in a degraded state.

In one embodiment, the control adapter 105 may modify the control performed by the lateral controller 102 in real-time by modifying the control target point and the gain K of the lateral controller 102, so as to minimize a predefined cost function. This makes it possible to minimize the control outlay and the lateral error as much as possible, despite the lack of trajectory information.

In one embodiment, the cost function J may for example be defined by:

$$J = \min(\int_{T_0}^{T_n} f(e_{lat}, SWA_{rate})) \quad (3)$$

In Equation (3), $e_{lat}$ represents the lateral error of the vehicle with respect to the trajectory, $SWA_{rate}$ represents the control output of the control device 10, which depends both on the control target point and the gain of the controller, $T_0$ represents the initial temporal horizon, $T_n$-represents the final temporal horizon for the temporal evaluation, and $f(.)$ represents the weight function.

It should be noted that the minimization performed by the lateral controller 102 is based on the same cost function but while furthermore adding the localization of the control target point in the minimization. Thus, the same equation may be used when the control target point needs to be degraded (mediocre trajectory perception) by including it as a parameter in Equation 3.

When the electronic horizon (e-horizon) is reduced, the localization of the control target point is no longer an optimization parameter but a fixed point insofar as the better performance is obtained with the furthest available control point that is below the optimal point.

Equation (3) is based on an evolution of a vehicle model in a "simulated" optimization in order to find the correct parameters. The vehicle model is used by the model adapter 105 in order to provide a simulated vehicle evolution in a time interval $[T_0, T_n]$. The lateral controller 102 communicates with the limit determination unit 103 and the actuator manager 108. The evolution of the vehicle model may be used to determine the better control option.

The dynamic vehicle model may take into account a set of state parameters that relate to the dynamics of the vehicle. The dynamic vehicle model may be represented in the following matrix form:

$$X_v = A_v X_v + B_v u_v \quad (4)$$

$$Y_v = C_v X_v$$

In Representation (4), $u_v$ denotes the steering angle instruction 6 also referred to (generally expressed in radians). Furthermore, $X_v$ denotes the state vector representing the current state of the vehicle, defined by a set of state parameters according to Relation (5):

$$X_v = [y_v, v_y, \psi_v, \omega_v] \quad (5)$$

In Formula 5 defining the state vector $X_v$, $y_v$ denotes the lateral position of the vehicle, $v_y$ denotes the lateral speed of the vehicle, $\psi_v$ denotes the yaw angle and $\omega_v$ denotes the yaw rate. The yaw angle is a parameter that informs of the quality of the guiding of this vehicle, in particular when cornering. The yaw angle represents the rotation of the vehicle about its vertical axis passing through its center of gravity, this angle being referenced with respect to a frame connected with the ground. The yaw angle represents the yaw movement of the vehicle.

In one embodiment, the matrices $A_v$, $B_v$ and $C_v$ of the dynamic model of the vehicle may be defined according to Definitions (6) to (8):

$$A_v = \begin{bmatrix} 0 & 1 & 0 & 0 \\ 0 & \frac{-(C_f + C_r)}{mv_z} & 0 & \frac{-\alpha C_f + bC_r}{mv_z} - v_x \\ 0 & 0 & 0 & 1 \\ 0 & \frac{-aC_f + bC_r}{l_z v_z} & 0 & \frac{-(a^2 C_f + b^2 C_r)}{l_z v_z} \end{bmatrix} \quad (6)$$

$$B_v = \begin{bmatrix} 0 & \frac{C_f}{m} & 0 & \frac{aC_f}{l_z} \end{bmatrix}^T \quad (7)$$

$$C_v = \begin{bmatrix} 0 & 1 & 0 & 0 \\ 0 & 0 & 0 & 1 \end{bmatrix} \quad (8)$$

In the definitions of the matrices $A_v$ and $B_v$, the quantities $C_f$ and $C_r$ denote the cornering stiffness in N/rad (newtons per radian), respectively in the front wheels ($C_f$) and rear wheels ($C_r$), $v_x$ denotes the speed of the vehicle, which may be determined on the basis of sensors on board the vehicle 2, m denotes the mass (in kg) of the vehicle, $I_z$ denotes the moment of inertia of the vehicle, a and b denote the distance (in meters) between the center of gravity of the vehicle and the front wheels (a) and between the center of gravity of the vehicle and the rear wheels (b).

The vehicle model defined by (4) may be applied in order to provide the lateral speed $v_y$ of the vehicle and the yaw angle $\psi_v$ of the vehicle 2.

The vehicle model may be used to reconstruct the future yaw rates. Global speed coordinate matrices are then populated on the basis of such future yaw rates, such matrices then being integrated in order to predict the future states of the vehicle.

In one embodiment, the control system 100 may comprise a global coordinate determination unit configured to calculate global coordinates of the vehicle 2, which represent the longitudinal speed and the lateral speed of the vehicle in a 2D plane representation, on the basis of the outputs provided by the vehicle model, in the form:

$$\dot{x}_{global} = \dot{x} \cdot \cos(\psi) - \dot{y} \cdot \sin(\psi)$$

$$\dot{y}_{global} = \dot{x} \cdot \sin(\psi) + \dot{y} \cdot \cos(\psi) \quad (9)$$

In Equation (9):
the parameter $\dot{x}$ denotes the longitudinal speed of the vehicle in a reference frame of the vehicle;
the parameter $\dot{y}$ denotes the lateral speed of the vehicle in a reference frame of the vehicle;
the parameter $\dot{x}_{global}$ denotes the longitudinal speed of the vehicle in a global reference frame;
the parameter $\dot{y}_{global}$ denotes the lateral speed of the vehicle in a global reference frame;
the parameter $\dot{y}_{global}$ denotes the heading angle of the vehicle.

Such parameters are used by the control adapter 105 to calculate a correct control response in the event that the e-horizon is smaller than that required for an optimal control.

In one exemplary embodiment, the actuators may comprise a steering angle actuator. The dynamics of the steering angle actuator, which are taken into account by the control adapter 105, may for example be in the form:

$$G(s) = \frac{w_n^2}{s^2 + 2\zeta w_n s + w_n^2} \quad (10)$$

In Equation (10), $w_n$ denotes the natural frequency of the steering system and $\zeta$ denotes the damping factor, these two parameters being dependent on the longitudinal speed of the vehicle.

Figure 3:
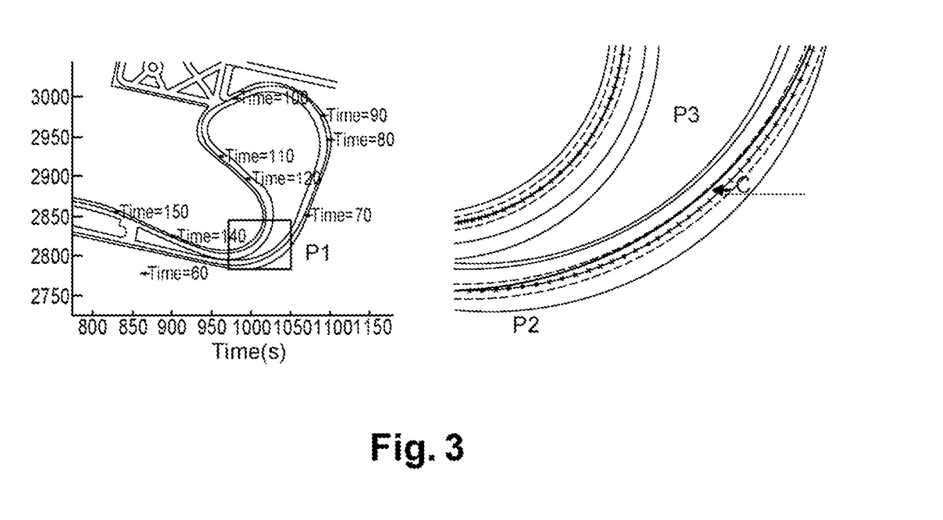
FIG. 3 illustrates the operation of a control device of the prior art.

FIG. 3 illustrates the operation of a controller of the prior art according to an exemplary scenario.

In the example of FIG. 3, the vehicle was used on a test track corresponding to the track of the left part of FIG. 3, and a degraded trajectory sensor was simulated by sending a short (and therefore insufficient) trajectory to the control device 10.

The left part of FIG. 3 represents a test scenario simulating such a degraded situation between seconds 55 and 70. The right part of FIG. 3 represents the enlarged trajectory zone P1 of the left part of FIG. 3, in which a correct behavior may be observed, the vehicle following the desired trajectory before an anomaly occurs in the zone denoted by "P2" before second 55. Once an anomaly has been emulated, the real vehicle 2 starts to deviate from its trajectory since the control device 10 is not suited to degraded situations, so that the driver needs to retake control at the point C in order to avoid the vehicle 2 ending up entirely in the left lane, the resumption of control by the driver corresponding to the part P3.

Figure 4:
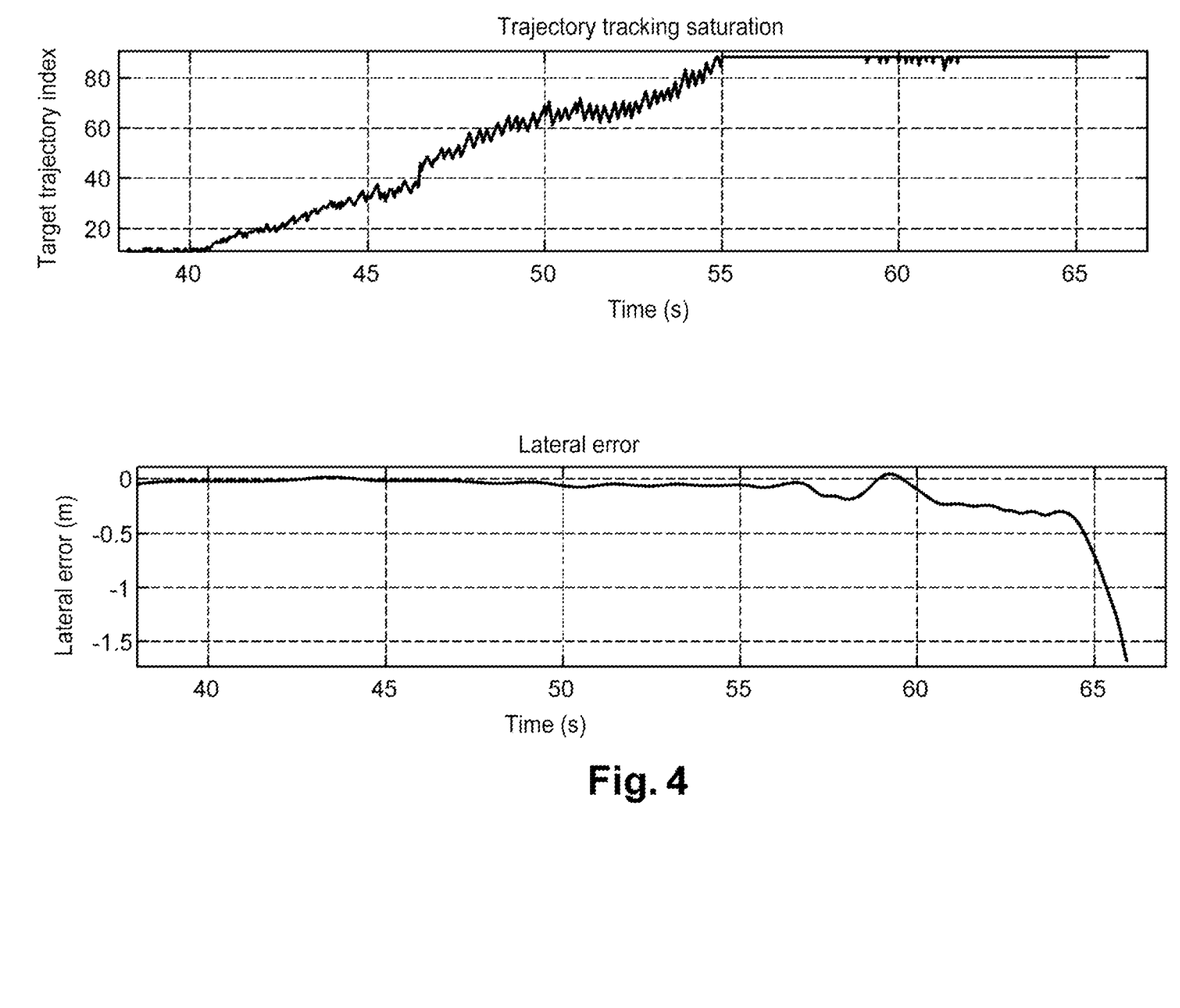

FIG. 4 represents the target trajectory vector index and the trajectory error corresponding to the case in which FIG. 3 is used, for a control device of the prior art.

The diagrams of FIG. 4 make it possible to illustrate the control performed according to the prior art: the control device according to the prior art exclusively uses a lateral controller based on an error minimization, like the lateral controller 102, but statically. The control device according to the prior art follows the trajectory until the moment when the trajectory becomes too small for the specifications of the lateral controller 102.

In the upper part of FIG. 4, the moment when the trajectory becomes too small for the control device of the prior art in the exemplary scenario of FIG. 3 may be seen at about 55 seconds, which corresponds to the point at which the maximum available trajectory is reached.

In the exemplary case of use considered in FIGS. 3 and 4, the trajectory is received in the form of a vector with 90 points, which includes various dynamic parameters of the vehicle such as the X and Y coordinates of the vehicle in the reference frame considered, the speed of the vehicle, the acceleration of the vehicle, etc.

The target trajectory index corresponding to the upper diagram in FIG. 4 represents the optimal control target point determined on the basis of the received trajectory.

When the index reaches a threshold value, here equal to 90, this means that it is no longer possible to apply the control device of the prior art, the index being saturated (trajectory tracking saturation). The lower diagram of FIG. 4 represents the lateral error, which starts to diverge if the configuration of the optimal control device is not suitable. In the example considered, the error starts to diverge at about 56 seconds, and if the trajectory is too small the vehicle ends up diverging entirely and departing from the lane or road limits. In the lower diagram of FIG. 4, it may be seen that the vehicle reaches a lateral error of more than 1.5 m before the driver retakes control at about 66 seconds.

Figure 5:
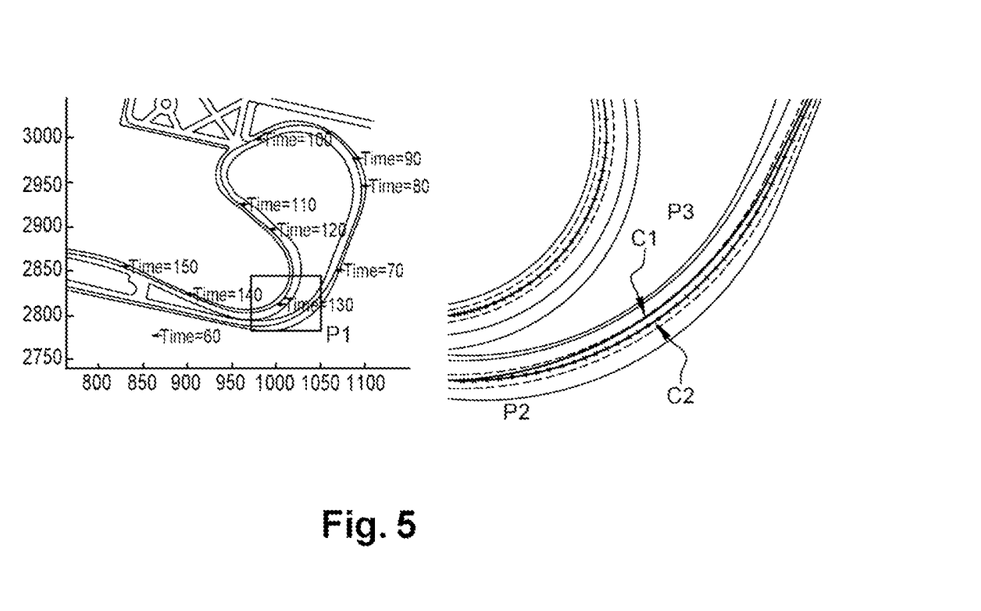
FIG. 5 illustrates the operation of a control device according to the embodiments of the invention.
Figure 6:
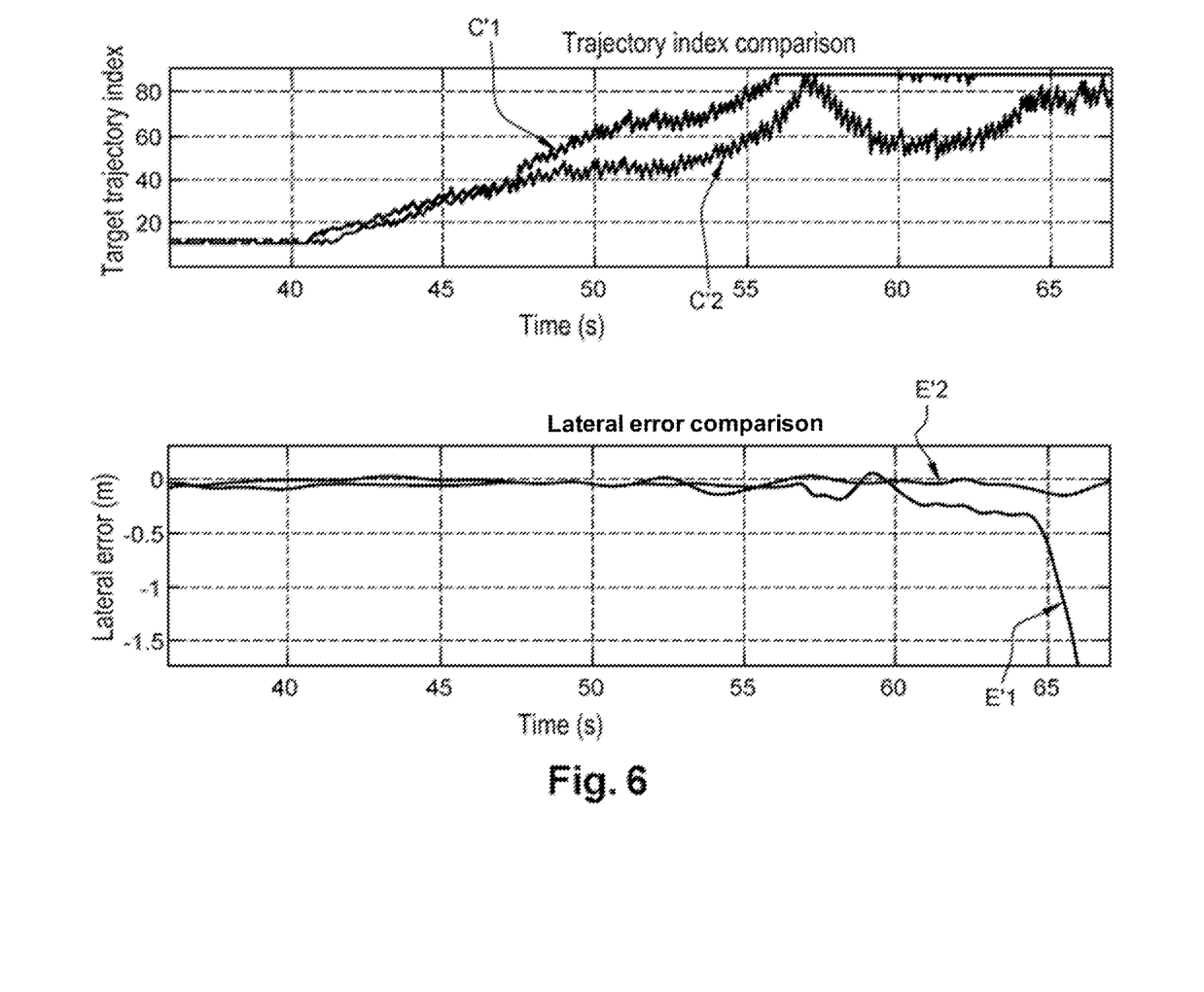

FIGS. 5 and 6 illustrate the performance of the control device 10 according to the embodiments of the invention.

In particular, FIG. 5 represents the operation of a static control device of the prior art, and in comparison the operation of the control device 10 adapted to the e-horizon, according to the embodiments of the invention, in an exemplary test scenario similar to that considered in connection with FIGS. 3 and 4.

When the lateral controller 102 is reconfigured by the control adapter 105, according to the embodiments of the invention, the vehicle 2 can follow the trajectory correctly even when it becomes too small.

FIG. 5 corresponds to a test scenario in which a single vehicle 2 performs two laps of the track. The left part of FIG. 5 represents the trajectory of the vehicle on the test track used, in the scenario considered. The right part of FIG. 5 is an enlargement of the zone P1 extracted from the left part of FIG. 5. It may be seen that the trajectory is degraded at the same point P2 as in the test case of FIG. 3. The curve C1 shows the trajectory of the vehicle 10 when the static control device of the prior art is used, and the curve C2 represents the performance of the vehicle when applying the dynamic control device 10 adapted to the e-horizon, according to the embodiments of the invention. It may be seen that at the point P3, the dynamic application of the control adapted to the e-horizon 102, as illustrated by the curve C2, allows the vehicle to follow the trajectory correctly beyond the point P2 without having to modify its speed.

FIG. 6 represents the target trajectory vector index and the trajectory error corresponding to the test scenario considered in FIG. 5, for a static control device of the prior art, and in comparison for the controller adapted to the e-horizon, according to the embodiments of the invention.

In FIG. 6, the static control device of the prior art corresponds to the curve C'1, while the dynamic control device 10 according to the embodiments of the invention is represented by the curve C'2. It may be seen that the static control device of the prior art C'1 saturates the trajectory at 55 seconds (upper diagram of FIG. 6), while the dynamic control device 10 adapted to the e-horizon, according to the embodiments of the invention, is capable of detecting such trajectory saturation situations and of adapting to a new degraded trajectory sensor situation. Thus, the dynamic control device 10 according to the embodiments of the invention is capable of adapting the control parameters in real-time and allows the vehicle to continue while remaining at the center of its lane, even when the trajectory information items are insufficient or degraded. The lower diagram of FIG. 6, representing the lateral error, shows that the control device 10 according to the embodiments of the invention surpasses the performance of the static control devices of the prior art and makes it possible to adapt to degraded trajectory sensor situations or to insufficient trajectory information items, while keeping the vehicle 2 at the center of the lane and at an optimal distance from the center line.

Figure 7:
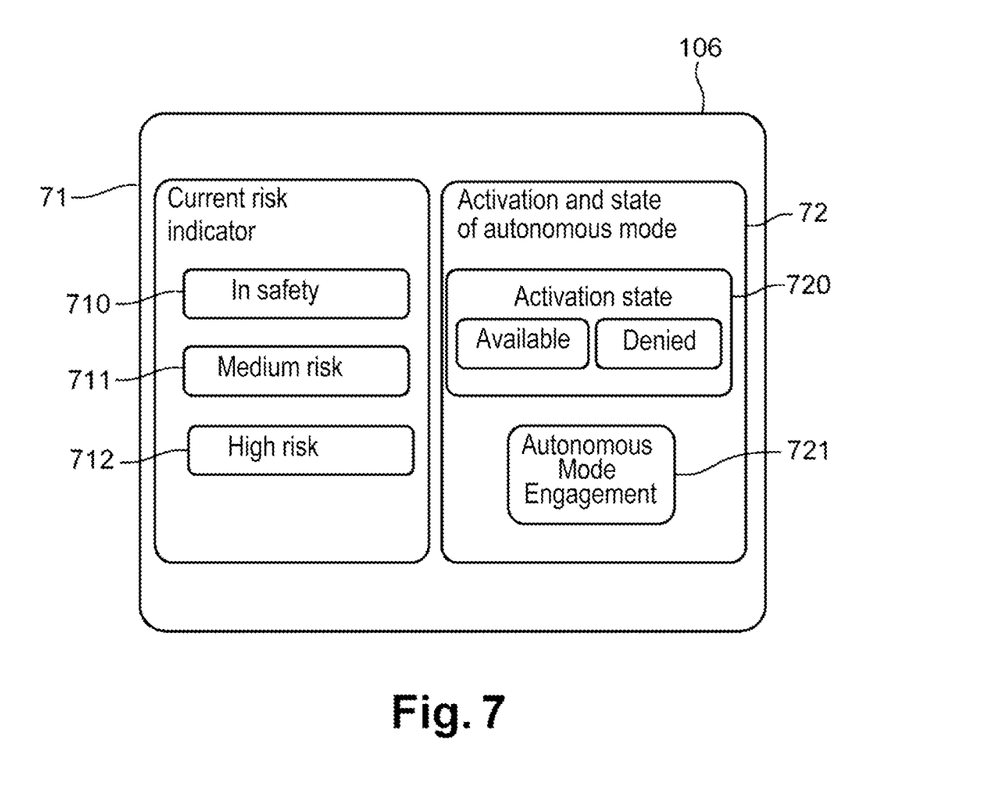
FIG. 7 represents a control interface associated with the control device, according to one exemplary embodiment of the invention.

In some embodiments, the control system 1 may be configured to calculate a set of control indicators, which may be provided to the driver via a human-machine interface, for example a screen arranged on the dashboard of the vehicle 1.

FIG. 7 represents an example of a control interface 106, which is associated with the control device 10 and on which the control indicators determined by the system are displayed.

In one embodiment, the control indicators may comprise a current risk indicator 71 that comprises a state information item of the control system (for example active or inactive) and a risk indicator indicating the risk associated with activation of the autonomous driving mode.

The risk indicators 71 may comprise a safety indicator 710 comprising a safety information item indicating whether the vehicle is receiving the complete trajectory and whether the control is being performed under optimal conditions.

The risk indicators 71 may comprise a medium risk indicator 711 indicating that the control is operating in a degraded mode. In a degraded mode, if the vehicle is in manual mode, engagement of the autonomous mode is not authorized, and if the vehicle is already in autonomous mode, the control device 10 according to the embodiments of the invention is applied.

The risk indicators may also comprise a high risk indicator 712 indicating that the received trajectory is not sufficient for the system to process a degraded trajectory sensor state, in which case control may be given automatically to the driver; an acoustic or haptic signal may be generated in order to reinforce the alert given to the driver.

Furthermore, the control system may determine an availability indicator 7200 of the automated control system ("available" or "unavailable") and an activation authorization indicator 7201 of the automated control system ("denied" or "authorized"). Such information items may be associated with a single set 720 of activation status information items in order to generate a display of these information items in a given display field.

The driver may activate the control system 1, for example by pressing on a control button 721 (referred to as "Autonomous Mode Engagement" in FIG. 7).

Figure 8:
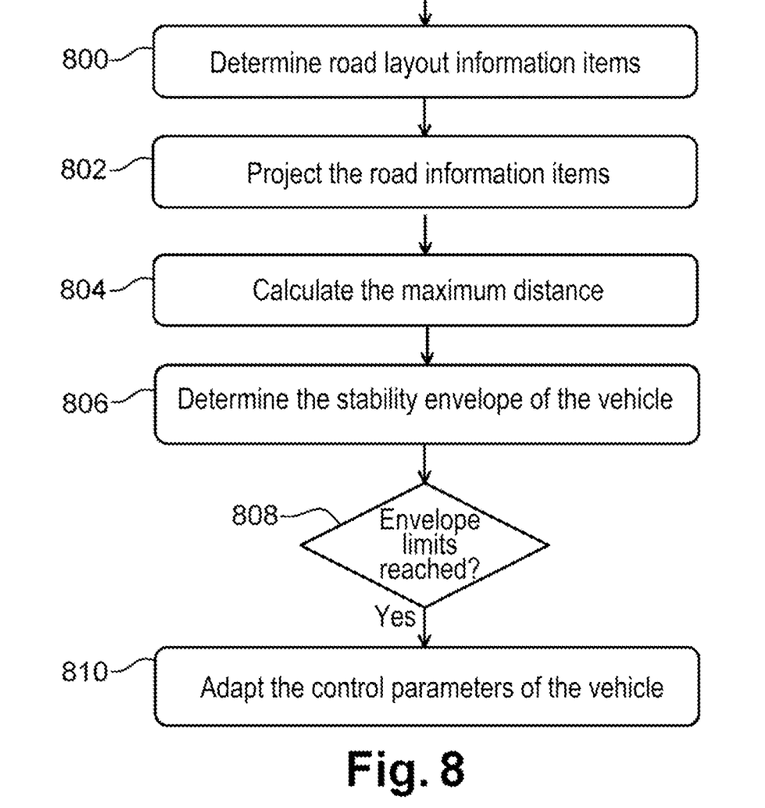
FIG. 8 is a flowchart representing the control method according to the embodiments of the invention.

FIG. 8 is a flowchart representing the control method according to the embodiments of the invention.

The control method is implemented for a current state of the vehicle 2.

In step 800, road layout information items are determined on the basis of information items provided by the perception system, the perception system using at least one trajectory sensor to determine the road layout information items, the road layout information items representing the trajectory to be followed by the vehicle 2. The road layout information items are represented by a polynomial function.

In step 802, the road layout information items that have been determined are projected into the scene of the vehicle as far as a given distance.

In step 804, the maximum distance at which the polynomial function representing the road layout satisfies one or more control conditions is determined on the basis of the projected road layout information items.

If such control conditions are satisfied, the trajectory detection is correct (with a maximum error, expressed in meters, in the detection of the control target point, in which case the maximum error may be adjusted as a function of the capacities of the control system 100; for example, the maximum error may be equal to 0.2 meter) with a sufficient distance for the lateral controller 102 to be able to work correctly.

Otherwise, if the control conditions are not satisfied, the controller 102 will work in degraded mode.

In step 806, a stability envelope of the vehicle, defined by limits corresponding to the application conditions of the optimal controller 1020 of the vehicle, is determined.

The stability envelope is defined by the correct trajectory detection between the maximum and minimum distance parameters that are detected by the maximum distance determination unit 103 and the limit verification unit 104.

In step 808, whether the limits of the stability envelope have been reached by the vehicle 2 is determined on the basis of the maximum distance that has been determined. If the limits have been reached, in step 810 the control parameters of the lateral controller 102 are adapted to the e-horizon on the basis of the current state of the vehicle (comprising the current position of the vehicle).

The embodiments of the invention make it possible to provide a response of the vehicle 2 to the control that is adapted to the e-horizon.

Advantageously, they make it possible to evaluate the violation capacity of the nominal controller 102 in real-time as a function of comfort/safety criteria.

They furthermore make it possible to modify the optimization control function of the optimal controller 102 so as to provide the best output suited to the input capacities.

The embodiments of the invention also make it possible to calculate a set of safety indicators, on the basis of which the driver of the vehicle may be alerted in real-time of the current state of the vehicle, as a function of the observed level of degradation.

More generally, they make it possible to guarantee safety of the vehicle on the basis of a real-time evaluation of the performance of the controller 102 and of an adaptation of the control parameters.

A person skilled in the art will understand that the control method according to the embodiments may be carried out in various ways by hardware, software, or a combination of hardware and software, particularly in the form of program code that may be distributed in the form of a program product, in various forms. In particular, the program code may be distributed with the aid of computer-readable Media, which may include computer-readable storage media and communication media. The methods described in the present description may, in particular, be implemented in the form of computer program instructions that can be executed by one or more processors in a computer informatics device. These computer program instructions may also be stored in a computer-readable medium.

Figure 9:
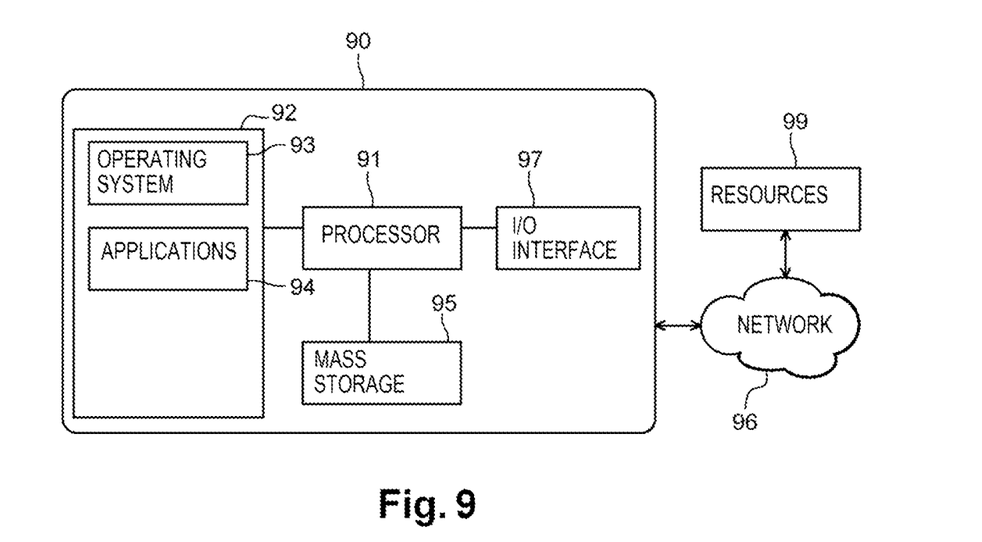
FIG. 9 represents an informatics device according to one embodiment of the invention.

In particular, as illustrated in FIG. 9, the decision control device 10 may be implemented in the form of one or more informatics devices 90 (referred to below as a computer). The computer 90 may have a processor 91, a memory 82, a mass storage memory device 95, at least one input/output (I/O) interface 97 (for example the HMI interface 70; the I/O interface 97 may include one or more video screens, touchscreens, input and control devices such as control buttons, microphones, etc.). The computer 90 may also be coupled functionally to one or more external resources via a network 96 and/or an I/O interface 97. External resources 99 may include, without being limited thereto, servers, databases, mass storage devices, peripheral devices, cloud-based network services, or any other suitable informatics resource that can be used by the computer 90.

The processor 91 may include one or more processor devices such as microprocessors, microcontrollers, central processing units, or any other device that manipulates signals (analog or digital) as a function of operating instructions which are stored in the memory 92. The processor 91 may operate under the control of an operating system 93 that is loaded in the memory 92. The operating system 93 may manage informatics resources such as an informatics program code integrated in the form of one or more software applications 94 loaded in the memory 92.

The invention is not limited to the embodiments described above by way of nonlimiting examples. It covers all alternative embodiments that may be envisioned by a person skilled in the art.

The invention claimed is:

1. A system for controlling a vehicle comprising a perception system that uses at least one trajectory sensor to determine a road layout, the road layout representing a trajectory to be followed by the vehicle, the system comprising a lateral control device that comprises:
   a road detector configured to determine, for a current state of the vehicle, information items of the road layout ahead of the vehicle based on of information items provided by said perception system, the road layout being represented by a polynomial function having a given order;
   a lateral controller configured to perform a lateral control of the vehicle, which is defined by a set of control parameters, based on of a minimization of a difference in a control value between a reference trajectory curve of the vehicle and a current trajectory curve being described by the vehicle, which corresponds to the current state of the vehicle including an e-horizon provided by the trajectory sensor, the e-horizon being a longest distance at which the trajectory sensor can operate;
   a maximum distance determination unit configured to project the road layout information items that have been determined to a given distance ahead of the vehicle, and to determine the maximum distance at which said polynomial function satisfies one or more control conditions based on of the projected road layout information items; and
   a limit verification unit configured to determine, for the current state of the vehicle, a stability envelope of the vehicle which is defined by limits corresponding to application conditions of a control adapter of the vehicle, and to verify whether said limits of the stability envelope have been reached by the vehicle based on of the maximum distance that has been determined, the limit verification unit determines that the limits of the stability envelope have been reached when the maximum distance exceeds the longest distance at which the trajectory sensor can operate,
   wherein the control adapter is configured to adapt said control parameters of the lateral controller when said limits have been reached, based on of the current state of the vehicle.

2. The system as claimed in claim 1, wherein the current state of the vehicle is defined by at least one state parameter among a steering angle of the vehicle, a steering angular velocity of the vehicle, a speed of the vehicle, a target curvature of the vehicle at a current instant considered.

3. The system as claimed in claim 1, wherein the control conditions define acceptability conditions of a set of predefined vehicle control objectives.

4. The system as claimed in claim 1, wherein the lateral control device further comprises a minimal performance verification unit configured to verify conditions relating to a set of auxiliary parameters that relate to a quality of a response of the vehicle to the control applied by the lateral control device, said control parameters comprising at least:
   a reliability parameter of the response of the vehicle to the control, and
   a feasibility parameter of the response of the vehicle with respect to dynamics of the vehicle as a function of the maximum distance determined by the maximum distance determination unit.

5. The system as claimed in claim 4, wherein a level of the quality of the control adapter is determined by the minimal performance verification unit, the minimal performance verification unit being configured to generate an alert signal when the quality level of the control adapter is greater than a predefined threshold.

6. The system as claimed in claim 1, wherein the lateral control device further comprises a vehicle actuator manager configured to manage at least one actuator of the vehicle as a function of the maximum distance calculated by the maximum distance determination unit and of an output of the lateral controller.

7. The system as claimed in claim 1, wherein the lateral control device further comprises a display manager configured to generate a display of a control mode of the vehicle as a function of an output of the maximum distance determination unit and of a quality level of the control adapter, the control mode comprising a mode among a non-autonomous mode, in which the control system is not activated, and an autonomous mode, in which the control system is activated.

8. The system as claimed in claim 1, wherein the control adapter is configured to adapt the control parameters based on of a minimization of the difference between a target yaw rate of the vehicle and a current yaw rate of the vehicle.

9. The system as claimed in claim 8, wherein the target yaw rate of the vehicle is calculated based on of a target curvature of the vehicle and the current position of the vehicle.

10. The system as claimed in claim 8, wherein the control adapter is configured to minimize a yaw rate error by multiplying it by a controller gain.

11. A vehicle control method implemented in a vehicle comprising a perception system that uses at least one vehicle trajectory sensor to determine a road layout, the road layout representing a trajectory to be followed by the vehicle, and a lateral controller that performs a lateral control of the vehicle defined by a set of control parameters, based on of a minimization of a difference in a control value between a reference trajectory curve of the vehicle and a current trajectory curve being described by the vehicle, which corresponds to a current state of the vehicle including an e-horizon provided by the trajectory sensor, the e-horizon being a longest distance at which the trajectory sensor can operate, the method comprising, for the current state of the vehicle, the following steps:

determining road layout information items corresponding to the current state of the vehicle based on of information items provided by said perception system, the road layout being represented by a polynomial function;

projecting the road layout information items that have been determined to a given distance ahead of the vehicle;

determining the maximum distance at which said polynomial function satisfies one or more control conditions based on of the projected road layout information items;

determining a stability envelope of the vehicle, which is defined by limits corresponding to application conditions of a control adapter of the vehicle;

determining whether said limits of the stability envelope have been reached by the vehicle based on of the maximum distance that has been determined, and the limits of the stability envelope are determined to have been reached when the maximum distance exceeds the longest distance at which the trajectory sensor can operate; and     adapting said control parameters of the control adapter when said limits have been reached, based on of the current state of the vehicle.

12. A non-transitory computer readable medium storing a computer program that, when executed by a computer, causes the computer to execute the steps of the vehicle control method as claimed in claim 11.

\* \* \* \* \*